United States Patent [19]
Singleton et al.

[11] 3,833,121
[45] Sept. 3, 1974

[54] PLASTIC FILTRATION SYSTEMS

[75] Inventors: Jack S. Singleton, Sparta; William McCaffery, Jr., Denville, both of N.J.

[73] Assignee: Brunswick Corporation, Skokie, Ill.

[22] Filed: Sept. 2, 1971

[21] Appl. No.: 177,351

[52] U.S. Cl............ 210/91, 137/625.34 X, 210/340, 210/436, 210/472
[51] Int. Cl............................................. B01d 35/12
[58] Field of Search ........... 210/340, 341, 436, 472, 210/91; 425/199; 137/625.34, 625.35

[56] References Cited
UNITED STATES PATENTS

| | | |
|---|---|---|
| 2,307,585 | 1/1943 | Harrington et al. ....... 137/625.35 X |
| 2,709,451 | 5/1955 | LaBour........................ 137/625.35 |
| 3,025,873 | 3/1962 | Ray............................ 137/625.34 X |
| 3,396,845 | 8/1968 | Bouskill..................... 210/341 X |

Primary Examiner—Frank A. Spear, Jr.

[57] ABSTRACT

A plastic filtration system for use with plastic extrusion machines is described. The filtration system comprises a pair of diverter spool valves incorporating special spool slots, ports, seals and seats for high pressure, high temperature applications, a pair of parallel filters in housings which permit easy removal and cleaning, and means for synchronously operating the diverter valves to prevent rapid changes in pressure drop through the system.

21 Claims, 5 Drawing Figures

INVENTORS.
JACK S. SINGLETON
WILLIAM McCAFFERY, JR.

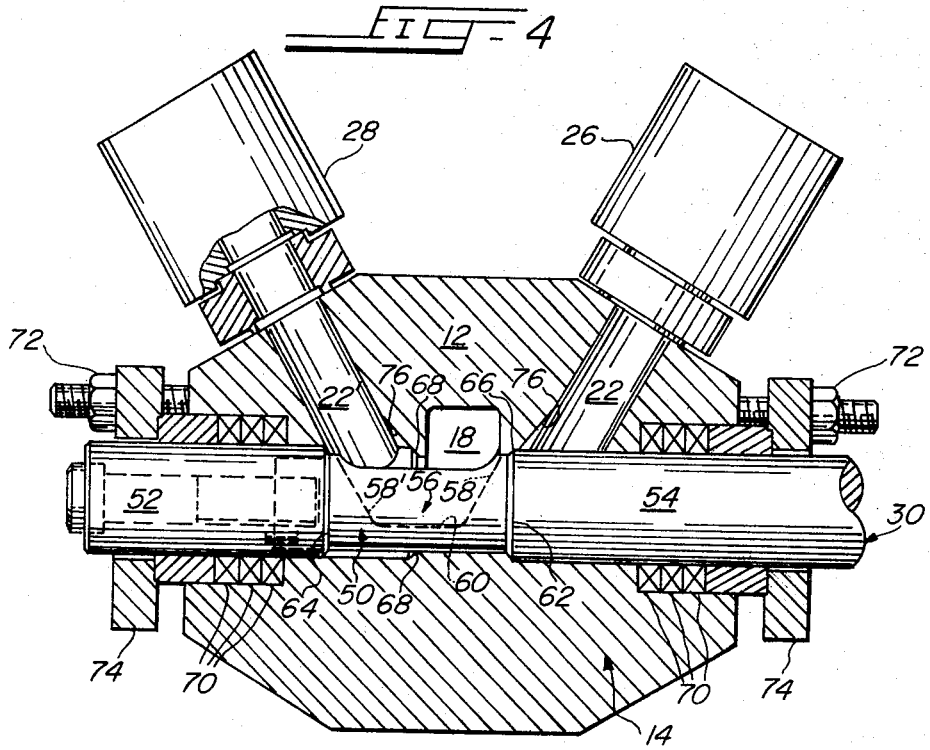

PLASTIC FILTRATION SYSTEMS

BACKGROUND OF INVENTION

1. Field Of Invention

This invention is in the field of machines for the extruding, molding or processing of plastic materials and more particularly is a plastic filtration system for removing particulate contaminants before product formation.

2. Description Of The Prior Art

Synthetic fibers for clothing and other applications are made by extruding plastic materials such as the polyhexamethylene polymers through fine holes measuring only a few mils in diameter and located in spinnerettes, as shown in U.S. Pat. No. 3,028,627 to McCormick on 10 Apr. 62. If the polymer melt contains granules of hardened plastic, metal particles from the extrusion machine, gels of incompletely mixed dyestuffs or other contaminants, the fine orifices in the spinnerette become clogged and the individual filaments forming the fibers break. When this occurs, the extrusion machine must be shut down, partially disassembled and cleaned. Once brought back on line, the fibers must be restrung on the high-speed winding machines before production can be resumed. All of this requires the use of skilled labor, and the combination of service costs plus the value of lost production is very expensive.

Obviously, the use of a filter to remove contaminants extends the service life of the spinnerettes and a number of these devices are used in the prior art. These can be divided into three basic categories and illustrated by the following U.S. Patents:

SPINNERETTE-FILTER PACKS
| | | |
|---|---|---|
| 3,028,627 | McCormick | 10 APR 62 |
| 3,353,211 | Heijnis | 21 NOV 67 |
| 3,488,806 | De Cocco | 13 JAN 70 |

SLIDE PLATE CHANGERS
| | | |
|---|---|---|
| 2,661,497 | Birmingham | 8 DEC 53 |
| 2,763,308 | Samler | 18 SEP 56 |
| 2,786,504 | Samler | 26 MAR 57 |
| 3,007,199 | Curtis | 7 NOV 61 |
| 3,112,525 | Moziek | 3 DEC 63 |
| 3,145,746 | Scher | 25 AUG 64 |

DUPLEX STRAINERS
| | | |
|---|---|---|
| 3,033,256 | Schrenk | 8 MAY 62 |
| 3,059,276 | Yokana | 23 OCT 62 |
| 3,193,877 | Edwards | 13 JUL 65 |
| 3,243,849 | Joukainen | 5 APR 66 |
| 3,455,357 | Zink | 15 JUL 69 |
| 3,480,706 | Carpenter, et al. | 25 NOV 69 |
| 3,501,806 | Schraeder | 24 MAR 70 |
| 3,503,096 | Marianelli | 31 MAR 70 |

The spinnerette-filter packs comprise a spinnerette plate and filter secured in a housing which can be removed as one unit from the extrusion machine. While inexpensive, they have the shortest time between service and require complete machine shutdown for replacement. The slide plate changers resemble the old color photograph slide projectors. In these units, a plate containing two large openings for replaceable filter screens is shifted back and forth so that first one filter and then the other is slipped in front of the spinnerette to remove particles. While superior to the spinnerette-filter pack, slide plate changers require strong power units when used with high pressure (i.e., 1000 psi) extruders because close tolerances on sliding surfaces are required to prevent leaks. These units also tend to introduce air bubbles and to generate sudden changes in extrusion pressure at the spinnerette, both of which cause changes in filament density which may be undesirable. The shortcomings of both of these systems are overcome in the duplex strainer systems.

In their most basic form, duplex strainers comprise a pair of filters or strainers connected in parallel between the diverter ports of a pair of diverter valves. One of the valves is known as the inlet valve and the other as the outlet valve. The common ports of the valve are connected in series with the conduit containing the material to be filtered. The valves are operated to gradually change the flow from one filter to the other without causing any rapid change in the pressure at the common port of the outlet valve. The used filter can then be removed and replaced without interrupting the operation of the extrusion. A schematic view of a typical system is shown in the drawings of the patent to Edwards, supra.

A major problem in successfully developing a duplex strainer is to build diverter valves which operate reliably for long periods with high-pressure (5000 psi), high-temperature (600° F.) extrusion and molding machines. As shown in the duplex strainer patents cited above, previous inventors —with the exception of Schraeder— have used a rotary plug valve (or some variation of it) to control the flow of material. Basically, the rotary plug valve comprises a circular or conical plug containing flow ports or holes which is carefully fitted into a matching valve cavity having orifices which match the plug ports. Rotating the plug to control the alignment between the ports and the orifices controls the throttling of the valve. The rotary plug valve will leak, however, as the clearance between the plug and the cavity wall increases — as during ordinary wear, for example. Although Zink, supra, teaches a system which can be adjusted (by turning bolt 80), others depend on careful machining, polishing or ring seals to control leakage. In any event, a properly fitted rotary plug valve in plastic filtration service is extremely difficult to turn and generally requires a power unit (such as Zink's fluid-powered actuator 110) for its operation.

Accordingly, it is a principal object of this invention to provide a plastic filtration system of simple construction which:

. exhibits high reliability in long service
. is easily serviced
. is not subject to valve leakage, and
. does not require power units for operation.

The attainment of this goal is in large measure due to the novel use of spool valves instead of rotary plug valves — particularly the modified spool valves described below — which provided unexpected superior performance in the plastic extrusion environment.

These features and other objects and advantages of this invention will be more fully described in conjunction with the following drawings in which:

FIG. 4 is a schematic cross-sectional view of a spool valve of this invention;

FIG. 5 is an isometric view of the system showing additional structural characteristics.

DESCRIPTION OF A PREFERRED EMBODIMENT

Figure 1:
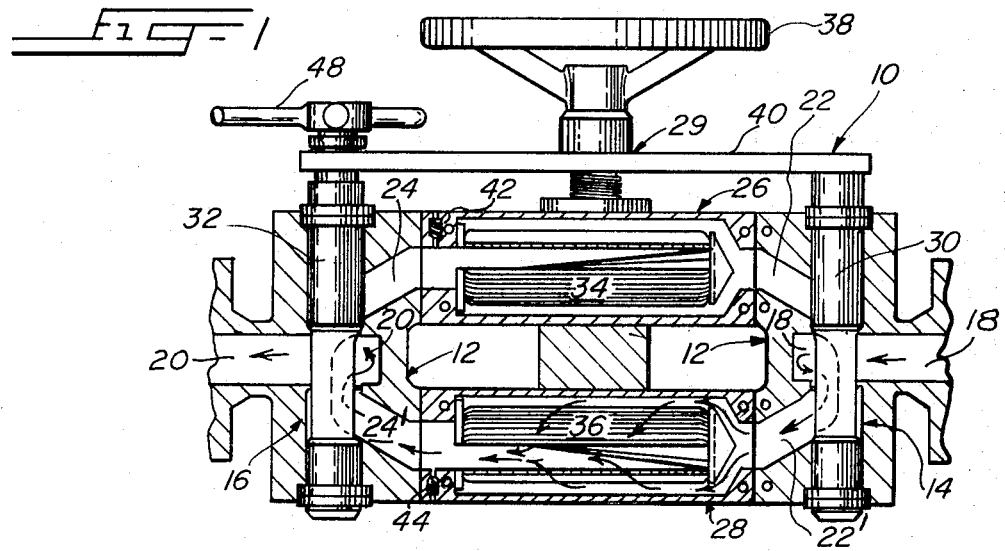
FIG. 1 is a diagrammatic view of a plastic filtration system of this invention showing material flow in one stable state.
Figure 2:
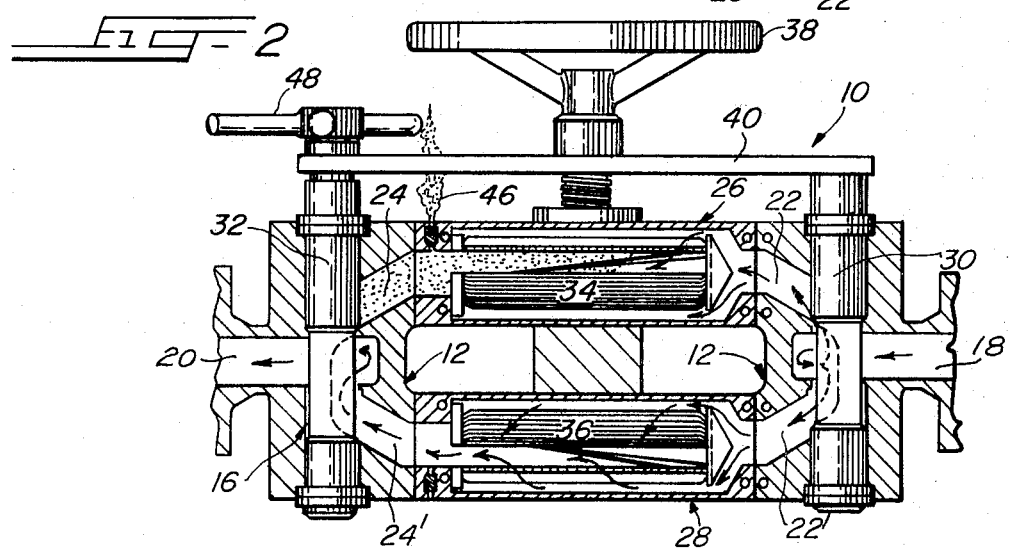
FIG. 2 is a diagrammatic view of the system of FIG. 1 showing material flow during a transition period when a new filter element is placed on stream.
Figure 3:
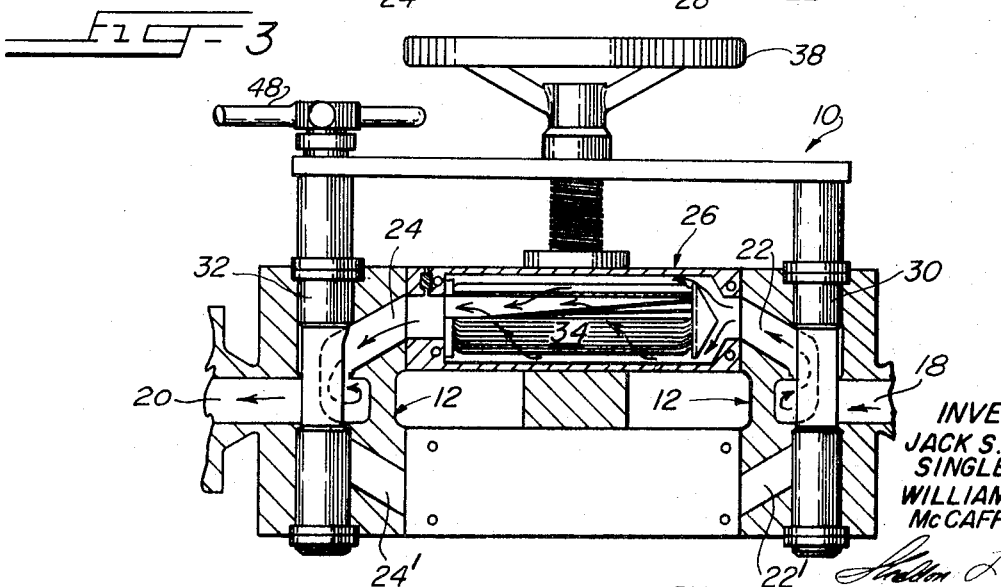
FIG. 3 is a diagrammatic view of the system of FIG. 1 showing material flow when filter changeover is completed.

A plastic filtration system 10 of this invention is diagrammatically illustrated in FIGS. 1–3, which show the change in material flow as the system switches from one filter to another. As illustrated, the filtration system comprises a valve body 12 containing

- a pair of diverter spool valves 14 and 16 each having a common port (18 and 20) and a pair of diverter ports (22, 22', 24, 24');
- a pair of filter housings (26 and 28) each communicating with one diverter port of each spool valve; and
- means 29 for synchronously moving the valves' spools (30 and 32) to divert the flow of plastic from one filter housing to the other.

Inside each filter housing (26 and 28) is a candle filter (34 and 36), which removes particles and other contaminants from the plastic passing from the extruder (not shown) through the inlet valve common port 18 to the spinnerette via outlet valve common port 20.

As shown in FIG. 1, all of the plastic material is flowing through filter 36. When the filter 36 becomes clogged with contaminants, the attendant operates the means 29 for synchronously moving the valve spools 30 and 32 to begin to divert the flow of plastic to filter housing 26 and filter 34 as shown in FIG. 2. He does this by turning handwheel 38 to move bar 40 to a very small distance. Bar 40, in turn, moves valve spool 30 to permit the plastic material to slowly fill filter housing 26 without substantially reducing the pressure in filter housing 28. At this point, outlet spool 32 has not moved because it is necessary to purge air from the system first, as bubbles will also cause filament breakage.

A novel feature of this filtration system is the method of purging trapped air. In the prior art duplex strainers, the rotary valves were provided with special vent passages to permit air to escape during changeover. (See Zink's bypass recess 120 and vent passage 134 as examples.) Such valve vents easily become clogged with plastic and require frequent maintainence for good performance. In this system of this invention, vents 42 and 44 are not part of the valves but instead are included in the removeable filter housings 26 and 28. As shown later, they are made as part of a threaded bushing which can easily be serviced or replaced.

Returning to the operation of the system as shown in FIG. 2, air in filter housing 26 is exhausted through vent 42 as illustrated by plume 46. Since the vent 42 is located at the highest point in the filter housing 26 (see the isometric view of FIG. 5), no air remains trapped as the plastic material fills the filter housing 26 and the chambers leading to diverter port 24. The vent 46 automatically seals when it becomes clogged with cooled, solidifying plastic.

When the attendant observes that air is no longer flowing from the vent 42 and a small amount of plastic appears in the vent holes, he operates the means 29 by turning the handwheel 38 for synchronously moving the valve spools 30 and 32 to complete the diversion of flow to filter housing 26 and filter 34. The change over is completed by operating vernier control 48 to move outlet valve spool 32 to the same position as inlet valve spool 30 as shown in FIG. 3 for full flow through filter housing 26. Filter housing 28 including filter 36 and vent 44 can now be removed and serviced. After replacement of housing 26, the changeover process can be reversed when filter 34 becomes clogged.

As described above, the use of spool valves instead of rotary plug valves provides unexpected superior performance in the plastic extrusion environment. Ordinarily, spool valves are not recommended for use with high pressure viscous materials because they tend to leak and they offer a high flow resistance. However, the benefits described are in part achieved because of new valve structures not found in conventional spool valves, such as:

- slots in the valve spool to aid material flow
- canted ports to eliminate sharp corners
- positive seating to stop leakage.

These features are illustrated in FIG. 4, which is cross-sectional view of inlet diverter spool valve 14.

As in conventional spool valves, inlet valve 14 contains a spool 30 having a zone 50 of reduced cross-sectional dimension as compared to the end zones 52 and 54. In this embodiment, a novel, axially-oriented slot 56 is machined into the reduced cross-section zone 50 to smooth the flow path of the viscous plastic moving from common port 18 to diverter ports 22 or 22'. Flow resistance is minimized by providing a short flow path through the valve and by eliminating sharp corners. For these reasons, the slots' end walls 58 and 58' are at approximately a 120° angle with respect to the slots' bottom wall 60 and the intersections of the walls of the slot are formed of smooth curves as shown so that the slot does not contain any corners. As shown, the slot 56 always opens into the common port 18 and into one diverter port 22 or the other 22' in response to the position of the valve spool 30.

Instead of placing the axes of the diverter ports at 90° to the axes of the spool as is done in prior art spool valves, the axes of diverter ports 22 and 22' have been canted at an angle of approximately 120° to the axis of the spool so that plastic material smoothly flowing from the slot 56 is not required to follow any sharp turns as the wall of the ports 22 and 22' blend into the end walls 58 and 58' of the slot 56. With this geometry, the diverter ports 22 and 22' are displaced from each other by an angle of approximately 60° and this permits the filter housing 26 and 28 to be nested close together to conserve space and yet provide ample working room.

The third novel feature of the spool valves of this invention is the use of integral seats to prevent leakage. Like rotary plug valves, leakage in conventional spool valves is controlled by carefully fitting the main valve bore with a polished spool. As with rotary plug valves, wear on sliding surfaces increases leakage and, in high pressure extruders, plastic could seep into dead zones and solidify to jam the spool. This is prevented by the positive seal system shown in FIG. 4, wherein the zone of reduced cross-sectional dimension 50 is terminated at each end by sealing shoulders 62 and 64 which mate with a pair of sealing seats 66 and 68 located in the valve body between the common port 18 and the diverter ports 22 and 22'. Because the sealing seats 66 and 68 have contours matching the sealing shoulders 62 and 64, a positive seal blocking off one or the other diverter ports is provided. Since the seal is not made on a sliding surface, there is little opportunity for wear; however, should the attendant observe seepage, he can increase the seal pressure by further tightening handwheel 38. Packing rings 70 provide further safeguards against leakage and they can be adjusted by tightening nuts 72 which secure pressure plates 74.

As stated earlier, a major objective of this invention is to provide a system which does not require a power assist unit and which provides a smooth transition without marked changes in pressure. The unique characteristics of the spool valve make attainment of these goals possible. Consider, for example, other types of reciprocating valves such as the piston valves taught by McNeal in U.S. Pat. No. 1,675,505 on 3 July 28 and Elliott in U.S. Pat. No. 1,758,565 on 13 May 30. The McNeal and Elliott valves comprise a large diameter piston which moves inside the common port from one diverter port to the other. While the valve is suitable for water purifications systems and the like, it would require a relatively large power assist to force the piston away from its seated position in the face of a high-pressure viscous plastic material pushing against the cylinder's large exposed surface. Furthermore, it is very difficult, if not impossible, to design such a valve so that it can be throttled from one position to another without causing unacceptable pressure changes. Whereas the spool valve can gradually open one diverter port as the other is gradually closed — note the slight flare of the diverter ports at 76 — the piston valve opens both ports completely at its midposition. This reduces the flow resistance by half and presents a pressure surge of material to the spinnerette which is then followed by a sudden decrease in flow rate when the valve is completely shifted. The result is a very uneven extrusion rate which will lead to filament failure.

FIG. 5 illustrates a preferred embodiment of a plastic filtration system of this invention for use with an extrusion machine. As can be seen there, the valve body 12 contains an outlet diverter spool valve 16 adjacent to body flange 78 which mates with a spinnerette or a metering pump with bolts secured to holes 82 surrounding outlet common port 20. The inlet diverter spool valve 14 is located at the opposite end of the valve body and is contiguous to an adapter flange 84 which is bolted to the extrusion machine. Handwheel 38 controls the position of bar 40 which, in turn, synchronously moves the inlet spool 30 and the outlet spool 32. Outlet spool 32 is also positioned with the aid of vernier control 48 as described above so that a fine adjustment can be made of the outlet valve with respect to the inlet valve.

As seen best in FIG. 5, the filter housings 26 and 28 have a unique structure for optimizing their performance in plastic extrusion. Each housing comprises:
. a main housing 86
. an end housing 88
. an air bleed bushing 90

The end housing 88 is secured to the main housing by bolts 94. The air bleed bushing 90 contains a vent such as 42 and is threaded into the end housing 88.

The filter housing is assembled by placing a candle filter into the main housing 86 and attaching the end housing 88 (containing the air bleed bushing 90) to the main housing with bolts 94. The entire assembly is then bolted onto the valve body by bolts 96 with the end housing 88 located over the outlet diverter spool valve 16. To remove and clean a filter housing from the valve housing while the system is in use, the procedure is reversed. Since there are no blind corners or pockets, the housings are easily cleaned. The tiny holes forming the air vents 42 of bleed bushing 90 occasionally remain clogged; however, the bushings are inexpensive parts and readily replaced.

The embodiment shown here is specifically adapted for use with extrusion machines for making synthetic yarns. In other configurations, it provides a great operating advantage for other types of plastic product formation systems, for example, those used to make fine sheets, film, webs and molded articles, where plastic filtration systems are needed to remove contaminants.

We claim:

1. A filtration system for removing particulate contaminates from a fluid stream comprising:
   a valve body containing a pair of diverter spool valves, each having a common port and a pair of diverter ports;
   a pair of filter housings, each communicating with one diverter port of each spool valve;
   means for synchronously moving the valves' spools to divert the flow of fluid from one filter housing to another; and,
   means for causing a smooth fluid flow from one filter to another without substantial pressure surges.

2. The filtration system of claim 1 wherein one of the spool valves comprises:
   a spool containing an axially oriented slot in a reduced cross-sectional zone of the spool.

3. The filtration system of claim 2 wherein:
   the slot opens into the common port.

4. The filtration system of claim 3 wherein:
   the slot opens into one diverter port or the other in response to the position of the valve spool.

5. The filtration system of claim 2 wherein:
   the slot does not contain any corners.

6. The filtration system of claim 2 wherein:
   the end walls of the slot are at approximately a 120° angle with respect to the bottom wall of the slot.

7. The filtration system of claim 1 wherein:
   the diverter ports are displaced from each other by an angle of approximately 60°.

8. The filtration system of claim 1 wherein one of the spool valves comprises:
   a spool having a zone of reduced cross-sectional dimension terminated at each end by a sealing shoulder.

9. The filtration system of claim 1 comprising in addition:
   a pair of filters, each located in one of the filter housings, for removing particulate contaminants from plastic.

10. The filtration system of claim 1 wherein:
    a filter housing may be removed from the valve body while the system is in use.

11. The filtration system of claim 1 wherein:
    the filter housings each contain an air vent.

12. The filtration system of claim 1 comprising in addition:
    a vernier connected to one of the spool valves whereby a fine adjustment can be made of one valve with respect to the other.

13. A spool valve comprising:

a valve body containing a common port and a diverter port opening into a spool chamber and having a sealing seat located between the common port and the diverter port;

a valve spool having a zone of reduced crosssectional dimension terminated at one end by a sealing shoulder having a contour matching the sealing seat;

means for moving the spool to operate the throttling of the valve; and, means operably associated with the spools to substantially prevent non-flow portions therein.

14. The spool valve of claim 13 wherein the spool contains:

an axially oriented slot in a reduced cross-sectional zone of the spool.

15. The spool valve of claim 14 wherein:
the slot opens into the common port.

16. The spool valve of claim 14 wherein:
the slot does not contain any corners.

17. The spool valve of claim 14 wherein:
the end walls of the slot are at approximately a 120° angle with respect to the bottom wall of the slot.

18. The spool valve of claim 13 wherein:
the axis of one of the ports is displaced from the axis of the spool chamber by an angle of approximately 120°.

19. The spool valve of claim 13 comprising in addition:

a second diverter port opening into the spool chamber.

20. The spool valve of claim 19 wherein:
the second diverter port is separated from the first diverter port by the common port.

21. The spool valve of claim 20 wherein:
a second sealing seat is located between the second diverter port and the common port, and a second sealing shoulder having a contour matching the second sealing seat terminating the other end of the spool's zone of reduced cross-sectional dimension.

* * * * *